No. 736,239. PATENTED AUG. 11, 1903.
A. E. ELLINWOOD.
DEVICE FOR SMOOTHING RUBBER TIRES.
APPLICATION FILED NOV. 10, 1902.
NO MODEL. 3 SHEETS—SHEET 1.

No. 736,239. PATENTED AUG. 11, 1903.
A. E. ELLINWOOD.
DEVICE FOR SMOOTHING RUBBER TIRES.
APPLICATION FILED NOV. 10, 1902.
NO MODEL. 3 SHEETS—SHEET 2.

Witnesses:
W. J. Hood
Maude Zwisler

Inventor:
Augustus E. Ellinwood
By C. E. Humphrey,
Atty.

No. 736,239. PATENTED AUG. 11, 1903.
A. E. ELLINWOOD.
DEVICE FOR SMOOTHING RUBBER TIRES.
APPLICATION FILED NOV. 10, 1902.
NO MODEL. 3 SHEETS—SHEET 3.

No. 736,239. Patented August 11, 1903.

UNITED STATES PATENT OFFICE.

AUGUSTUS E. ELLINWOOD, OF AKRON, OHIO, ASSIGNOR TO THE GOODYEAR TIRE & RUBBER COMPANY, OF AKRON, OHIO.

DEVICE FOR SMOOTHING RUBBER TIRES.

SPECIFICATION forming part of Letters Patent No. 736,239, dated August 11, 1903.

Application filed November 10, 1902. Serial No. 130,715. (No model.)

*To all whom it may concern:*

Be it known that I, AUGUSTUS E. ELLINWOOD, a citizen of the United States, residing at Akron, in the county of Summit and State of Ohio, have invented a certain new and useful Improvement in Machines for Smoothing Rubber Tires, of which the following is a specification.

My invention has relation to improvements in devices for perfecting rubber tires for vehicles of the class named that are vulcanized between oppositely-disposed molds. In the construction of these tires it is found that the tire when vulcanized and removed from the mold has on each side a thin integral projection, technically called a "fin," that must be removed before the tire is in suitable shape and condition for the market or for use and which fin has to be removed by excision of some kind. The general object of my invention is to provide a machine by which these fins may be quickly removed without the use of a knife, sandpaper, or skilled labor and the removal of which will leave the surface of the tire at that point practically smooth.

Another and special object in this machine is to remove the fins from what are known as "wing-tires" and made in substantial accordance with the patent granted to J. A. Burrows April 25, 1899, and numbered 623,703, in which the fins occur on the outside edge of the wing portion of the tire and which wing is comparatively separated from the main body portion of the tire and very susceptible of yielding too easily to the thrust of a grinding-wheel, thereby causing the fin situated on the wing to be pushed aside rather than be excised.

To the accomplishment of the aforesaid objects my invention consists in the peculiar and novel construction, arrangement, and combination of parts hereinafter described and then specifically claimed, reference being had to the accompanying drawings, forming a part hereof.

Figure 1:
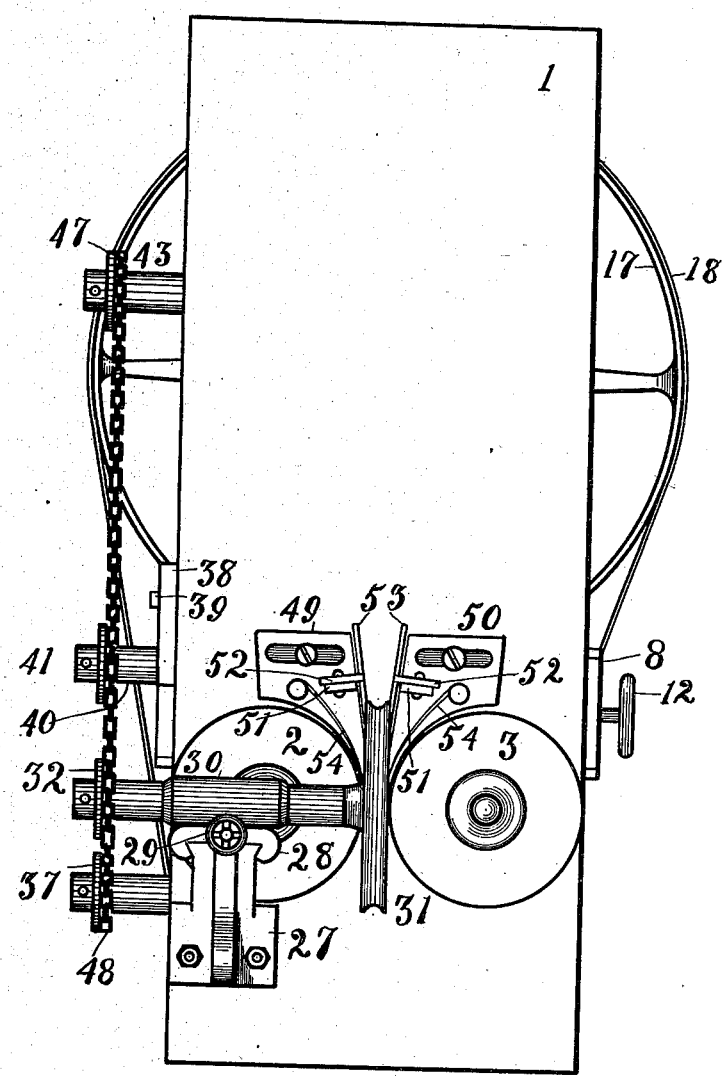
Figure 2:
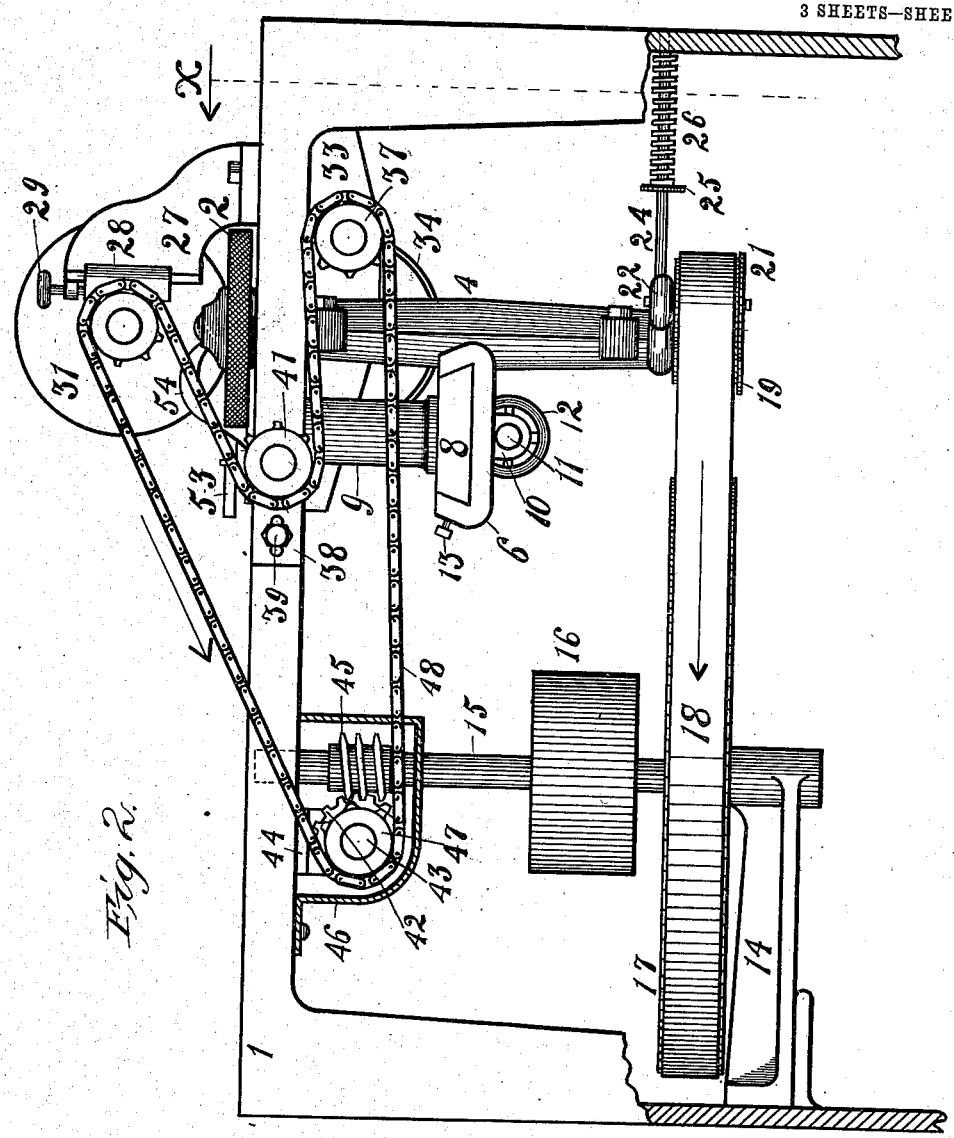
Figure 3:
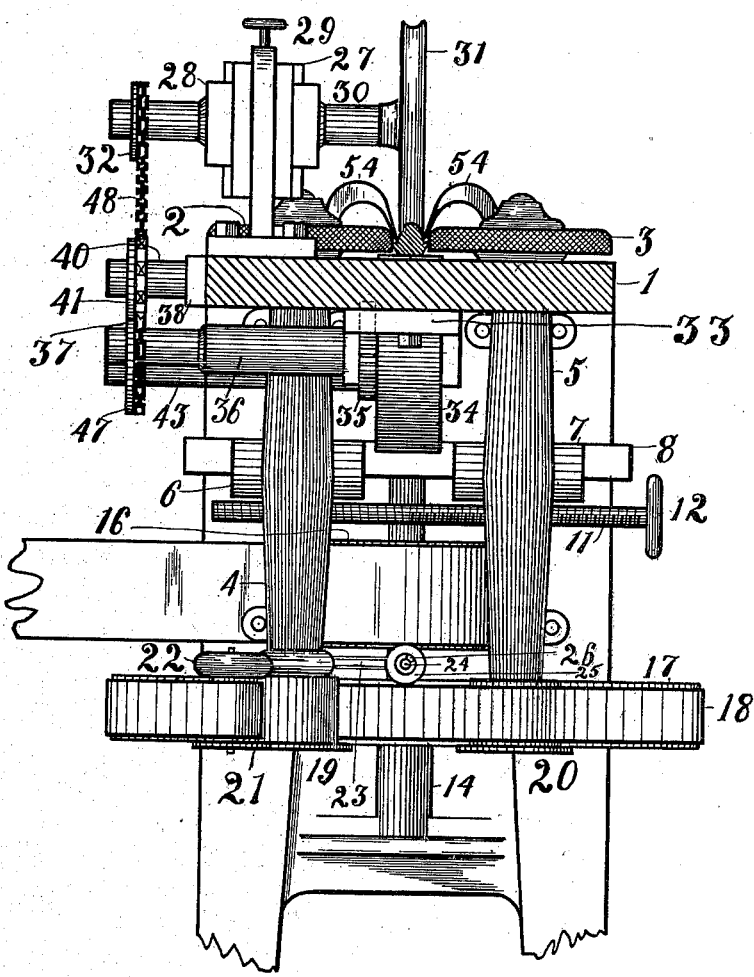

In the accompanying drawings, in which similar reference-numerals indicate like parts in the different figures, Figure 1 is a plan of my machine; Fig. 2, a side elevation looking from the left of Fig. 1. Fig. 3 is a section at the line *x* of Fig. 2; and Figs. 4 and 5, sectional views of an ordinary tire and a wing-tire, respectively.

In the drawings, 1 is a table-top supported on suitable legs to bring its upper surface at such a height as can be conveniently reached by workmen using the machine. The tires are fed centrally and longitudinally across this table, with their tread portion upward and their base portion, which is intended to fit the iron channeled tire of the wheel, sliding on the table-top. In this position the two fins project laterally from the tire, (see Fig. 4,) and in their transit across the table they pass between two emery-wheels 2 3. These emery-wheels are mounted on shafts in long bearings 4 5, respectively, and the emery-wheels are designed to run with great rapidity in a direction opposite to that of the travel of the tires passing over the table-top 1. The long bearings 4 5 are made integral with carriages 6 7, slidable transversely to the course of the tires on a dovetail bracket 8, supported by two posts 9, fastened to the under side of the table-top.

Depending from the under side of each of the carriages 6 7 are lugs 10, having perforations therein which are screw-threaded, the threads in the lugs on these carriages being opposite to each other. A screw 11 is arranged to mesh in each of the openings in these lugs 10 and is provided with a hand-wheel 12, by which it may be rotated with a view to adjusting the distance between the emery-wheels 2 3, the table-top 1 being slotted at this point to permit a transverse motion of the emery-wheel shafts, which pass therethrough. Each of the carriages 4 5 is provided with a set-screw 13, by which it may be locked in position firmly after its location is decided upon, which is determined by the size of tire upon which this machine is to operate. Motion is communicated to these emery-wheels in the following manner: Mounted in bearings, which consist of a bracket 14 and a hole in the under side of the table, is a vertical shaft 15, near the center portion of which is a pulley 16, to which a belt is applied, receiving power from any nearby source. Below this pulley 16 on the shaft 15 is a large pulley 17, around which passes a belt 18. On the lower end of the shafts in the bearings 4 5 are small pulleys 19 20, respectively. The belt 18 is designed to pass around the pulley 20, and thence around the back face of the pulley 19, and from thence around the pulley 17; but as the position of the pulleys 19 20 may be varied as the emery-wheels are brought more closely together or drawn more widely apart, due to the peculiar working of this machine, I interpose a constantly-acting belt-tightener with a view to keeping the belt 18 taut at all times. This belt-tightener consists of an idler-pulley 21, supported by a shaft in a swinging bracket 22, whose working center is on the long bearing 4. From this bracket 22 projects an arm 23, to which is attached a lever 24, on which is a tight collar 25, and a spring 26, the normal tendency of which is to throw the lever 24 outward from the lug of the table, thereby throwing the idler-pulley 21 in the opposite direction with a view to keeping the belt tight, the size of the pulley 17 being relatively a great deal larger than the pulleys 19 20. The emery-wheels are revolved with great speed, which is necessary in the excision of rubber, which because of its elastic nature is gifted with a tendency to be pushed backward from the excising-tool, rather than suffer the abrasion which is desired.

The means by which the tires are fed at a determined speed between the emery-wheels 2 3 consists of the following mechanism: Mounted on the upper face of the table-top 1 is an upright bracket 27, the front face of which is dovetailed and on which slides vertically a carriage 28. The vertical position of this carriage is varied by means of a hand-wheel 29 operating a screw, the lower end of which is connected with the carriage 30, in which is a shaft having on its inward end a grooved pulley 31, which is designed to rest on the upper part of the tire and press with considerable force thereon. The opposite end of this shaft in the bearing 30 bears a sprocket-wheel 32 for a purpose to be stated later. On the under side of the table 1, centrally below the grooved wheel 31, is a long box-bearing 33, in which is mounted a flat-faced pulley 34, whose vertical position is always the same and whose outer face is arranged to project through an opening in the table and slightly above the plane of its upper face, so that as the tire in advancing along the table will be raised slightly from the surface of the table at the instant that the grinding-wheels attack its sides and while being pressed downward by the grooved pulley 31. On the shaft on which is mounted the pulley 34 is also mounted a small spur-gear, (not shown,) which meshes into a similar gear 35 on a transverse shaft mounted in a bearing 36, made integral with the box 33. The outer end of this shaft in this bearing 36 is provided with a sprocket-wheel 37 for a purpose to be stated. On the side of the table 1 is a plate 38, which is capable of longitudinal movement by reason of the fact that it is attached to the table by means of a bolt 39, and the opening in the plate 38, through which the bolt 39 passes, is slotted with a view to permitting this movement. Projecting from this plate 38 is a bearing 40, within which is a shaft having on its outer end a sprocket-wheel 41 for a purpose to be stated. On the under side of the table 1 and adjacent to the shaft 15 is a worm-wheel 42, mounted on a shaft 43, sustained in brackets 44 to the under side of the table. This worm-wheel is arranged to intermesh with a worm 45 on the shaft 15, and the worm-wheel and worm are arranged to be inclosed in an oil-box 46 with a view to providing constant lubrication for these intermeshing gears.

On the outer end of the shaft 43 is a sprocket-wheel 47, around which runs a sprocket-chain 48, which also passes over sprocket-wheel 32 and thence backward around the idler-sprocket 41, thence forward around the sprocket 37 and back to the sprocket 47. By this sprocket-chain 48 motion from the vertical shaft is communicated, with retarded speed, to the grooved pulley 31 and the flat pulley 34, thus furnishing the motive power for these two feeding-wheels to cause the tires to pass longitudinally along the table. In excising the fins on the tire constructed similar to Fig. 4 the flat-face emery-wheels, similar to those shown in Fig. 2, may be used, and in order to direct the tire with accuracy to the feed-wheels 31 and 34 I place on the face of the table 2 similar guide-plates 49 50, held adjustably to the table by screws passing through the slots in the guide-plates. The swinging faces of these guide-plates are so shaped that they converge toward one another and extend nearly to the working-point of the emery-wheels 2 3. Rising from the face of each of these guide-plates are upright standards 51, to which are attached arms 52 of long flat supplemental guides 53, the object and purpose of which are to press downward on the advancing tire upon the upper inclined portion immediately above the point where the fin occurs. These upper supplemental guides 53 extend as far as is practicable toward the working-point of the emery-wheels.

Figure 4:
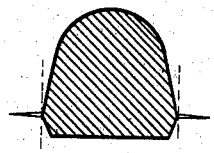
Figure 5:

It will be noticed by an examination of the section of tire shown in Fig. 4 that all that is necessary to do to excise the fins thereon is to rotate the emery-wheels with great rapidity and force them up against the main body portion of the tire, which will cause a complete excision and smooth the sides thereof; but it will likewise be noted that in excising the fins from the tire, a section of which is shown in Fig. 5, by reason of the long slender projecting wings on which the fins occur the amount of material in the fins is so slight that the fins and wings will be more likely to be pushed inward toward the tire than to have the fins removed to a definite line. Experience having demonstrated this tendency to push aside the fin in this particular instance rather than excise the same, I place on each of the plates 49 50 two curved fingers 54, which project forward and press upon the tire between the body portion and the wings, with a view to sustaining and forcing outward the wing and the fin to cause the grinding-wheels to better accomplish their function by furnishing a more suitable support for the lateral wings during the operation.

It is believed that the operation has been sufficiently described by describing the component parts thereof.

What I claim, and desire to secure by Letters Patent, is—

1. In a machine of the class designated the combination of a table to support the tires passing thereover, excising means situated on either side of the path of said tires, feeding devices situated above and below said tire with means to revolve them, one of said feeding devices being capable of raising said tire slightly above the surface of the table and excising means placed to simultaneously attack both sides of said tire.

2. The combination of excising means placed on opposite sides of the path of the tires being operated on by this machine and a feeding-wheel adapted to raise said tire from the surface of the table on which it is designed to travel, and spreading-fingers capable of forcing outward portions of tires during the process of excision, substantially as shown and described.

In testimony that I claim the above I hereunto set my hand in the presence of two subscribing witnesses.

AUGUSTUS E. ELLINWOOD.

In presence of—
C. E. HUMPHREY,
MAUDE ZWISLER.